(12) United States Patent
Kohlhepp

(10) Patent No.: US 10,242,316 B2
(45) Date of Patent: Mar. 26, 2019

(54) ROBOTIC CAPABILITY MODEL FOR ARTIFICIAL INTELLIGENCE ASSISTED MANUFACTURING SUPPLY CHAIN PLANNING

(71) Applicant: Christoph Adam Kohlhepp, Mount Riverview (AU)

(72) Inventor: Christoph Adam Kohlhepp, Mount Riverview (AU)

( * ) Notice: Subject to any disclaimer, the term of this patent is extended or adjusted under 35 U.S.C. 154(b) by 131 days.

(21) Appl. No.: 15/186,474

(22) Filed: Jun. 19, 2016

(65) Prior Publication Data

US 2017/0278000 A1 Sep. 28, 2017

Related U.S. Application Data

(60) Provisional application No. 62/345,887, filed on Jun. 15, 2016, provisional application No. 62/344,415, filed on Jun. 2, 2016.

(51) Int. Cl.
  *G06N 5/02* (2006.01)
  *G05B 19/418* (2006.01)
  *G06N 3/02* (2006.01)

(52) U.S. Cl.
  CPC ....... *G06N 5/022* (2013.01); *G05B 19/41835* (2013.01); *G06N 3/02* (2013.01); *Y02P 90/20* (2015.11); *Y02P 90/265* (2015.11)

(58) Field of Classification Search
  None
  See application file for complete search history.

(56) References Cited

U.S. PATENT DOCUMENTS

| | | | | |
|---|---|---|---|---|
| 7,054,706 B2 * | 5/2006 | Kempf | ................. | G06Q 10/087 700/108 |
| 7,519,446 B2 * | 4/2009 | Fujii | ................... | G05B 19/418 700/108 |
| 7,912,568 B2 * | 3/2011 | Bagwell | ........... | G05B 19/41865 700/103 |
| 8,126,767 B1 * | 2/2012 | Aldridge | ................ | G06Q 10/04 705/7.36 |
| 8,271,870 B2 * | 9/2012 | Verma | ................... | G06F 17/274 715/237 |
| 9,317,596 B2 * | 4/2016 | Donndelinger | ... | G06F 17/30734 |
| 2002/0165744 A1 * | 11/2002 | Juras | ...................... | G06Q 10/06 705/7.37 |
| 2006/0106477 A1 * | 5/2006 | Miyashita | ........ | G05B 19/41885 700/103 |
| 2007/0050070 A1 * | 3/2007 | Strain | .................... | G06Q 10/06 700/99 |
| 2008/0154909 A1 * | 6/2008 | Dam | ................. | G06F 17/30943 |

(Continued)

*Primary Examiner* — Kenny S Lin

(57) ABSTRACT

A computer-implemented method for automating manufacturing supply chain planning, comprising: (a) providing a computer processor for processing data; (b) providing at least one input device; (c) providing at least one output device; (d) providing a computer readable storage device; (e) providing a first ontology for defining a product in terms of the method of manufacture of said product or for defining a plurality of products in terms of the method of manufacture of said products; (f) providing a second ontology for defining the capabilities of a plurality of manufacturing facilities; and g) providing a knowledge representation and reasoning system executed on said computer processor.

20 Claims, 10 Drawing Sheets

(56) References Cited

U.S. PATENT DOCUMENTS

| | | | | |
|---|---|---|---|---|
| 2009/0150208 A1* | 6/2009 | Rhodes | .............. | G06Q 10/0631 |
| | | | | 705/7.12 |
| 2010/0185700 A1* | 7/2010 | Bodain | ............. | G06F 17/30734 |
| | | | | 707/803 |
| 2010/0306079 A1* | 12/2010 | Zmolek | .................. | G06Q 10/10 |
| | | | | 705/26.5 |
| 2012/0010758 A1* | 1/2012 | Francino | ................ | G05B 17/02 |
| | | | | 700/291 |
| 2015/0235143 A1* | 8/2015 | Eder | ...................... | G16H 50/50 |
| | | | | 706/12 |
| 2016/0364377 A1* | 12/2016 | Krishnamurthy | ..... | G06F 17/271 |
| 2017/0031335 A1* | 2/2017 | Sakakibara | ............ | G05B 15/02 |
| 2017/0153627 A1* | 6/2017 | Jager | .................. | G06Q 10/0631 |

* cited by examiner

ROBOTIC CAPABILITY MODEL FOR ARTIFICIAL INTELLIGENCE ASSISTED MANUFACTURING SUPPLY CHAIN PLANNING

CROSS-REFERENCE TO RELATED APPLICATIONS

The present application claims priority to Australian Provisional Patent Application serial number 2016901133, filed on Mar. 28, 2016 and Australian Provisional Patent Application serial number 2016901519, filed on 25 Apr. 2016 and U.S. Provisional Patent Application Ser. No. 62/345,887, filed on Jun. 15, 2016 and U.S. Provisional Patent Application Ser. No. 62/344,415, filed on Jun. 2, 2016, the disclosures of which are hereby incorporated in their entirety at least by reference.

COPYRIGHT NOTICE

A portion of the disclosure of this patent document contains material, which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

TECHNICAL FIELD

The present disclosure relates generally to systems and methods for optimizing manufacturing supply-chains using a knowledge representation and reasoning system.

BACKGROUND

Models of manufacturing have become increasingly complex along supply chains spanning the globe. With the advent of robotics and advanced manufacturing, individual aspects of this supply-chain have become increasingly automated. Awaiting full automation is the supply-chain itself. Automated reasoning about product design and connecting this to robotic capabilities is a step in that direction and the subject of this disclosure.

The Knowledge Interchange Format (KIF) is a computer language designed to enable systems to share and re-use information from knowledge systems.

An ontology is a system for the formal definition of types, and/or properties, and/or interrelationships of entities that exist for a particular domain of discourse. The study of Artificial Intelligence (AI) creates ontologies to limit complexity and to organize information. The ontology can then be applied to automated problem solving.

A knowledge representation and reasoning system is a language and environment for constructing intelligent, knowledge-based applications. A typical knowledge representation and reasoning system incorporates features from predicate calculus, a branch of discrete mathematics. Advanced systems complement this discrete mathematics with functional programming concepts, relational database concepts, and quantitative models from the domain of statistics. The PowerLoom® Knowledge Representation & Reasoning System is a knowledge representation and reasoning system by the University of Southern California, that employs the Knowledge Interchange Format.

Build-Your-Own-Blocks is a framework to create Domain Specific Languages as an extension to Scratch. Scratch is a visual programming language where one can create interactive stories, games, and animations. Build-Your-Own-Blocks and Scratch allow basic syntax constructs of a programming language to be represented graphically in a paint-on-a-canvas style application. The approach is primarily targeted at children in educational settings, but it has yet to find wide application in an industrial setting, largely owing to limited expressiveness of the tools and language.

BRIEF SUMMARY OF THE INVENTION

The described technology concerns one or more methods and systems to enable artificial intelligence supported product design in an automated manufacturing setting employing the use of robots. The use cases supported by the described technology are as described. Given a population of robots and a systematic product description, the described technology will be able to do the following:
  a) Answer the question as to whether a product can be built: a feasibility analysis
  b) Detail the exact operations required to build a product end-to-end
  c) Formulate a manufacturing plan describing the robots required to build a product
  d) Apply optimization constraints to feasibility analyses and manufacturing plans In various embodiments, the described technology combines a robotic capability model with a manufacturing ontology in an artificial intelligence reasoning system that supports classification of robotic capabilities and formulation of product descriptions in terms of the manufacturing steps utilizing these robotic capabilities and which are needed to produce the various products.

The output of the system is a sequence of steps required to produce the product in question, which satisfy and optimize given specifications. The method is designed to formulate manufacturing plans for bespoke products. This enables intelligent product design by consumers, application software, and manufacturers alike with a view towards supply chain automation, in particular with a view towards a pull supply-chain model.

In support of the above use-cases, we present a robotic capability ontology and a manufacturing ontology unified in a knowledge representation and reasoning system. The knowledge representation and reasoning system allows the application of constraints and statistical prediction models through a rule based deduction engine with a view towards optimizing the automated manufacture of products by robotic facilities. We further integrate deductive reasoning with qualitative and quantitative reasoning to allow optimization of manufacturing plans in real world settings. Additionally, we present a method of making the described technology accessible to non-technical users through visual modeling.

Many of the details, functions and other features shown and described in conjunction with this description are illustrative implementations of particular embodiments of the present disclosure. Accordingly, other embodiments can have other details, functions and features without departing from the spirit and scope of the present disclosure. In addition, those of ordinary skill in the art will appreciate that further embodiments of the present disclosure can be practiced without several of the details described below.

Certain details are set forth in the descriptions of FIGS. 1-14 to provide a thorough understanding of various embodiments of the present disclosure. A person of ordinary skill in the relevant art will understand that the present disclosure may have additional embodiments that may be practiced without several of the details described below. In other instances, those of ordinary skill in the relevant art will appreciate that the methods and systems described can include additional details without departing from the spirit or scope of the disclosed embodiments.

DETAILED DESCRIPTION

Figure 1:
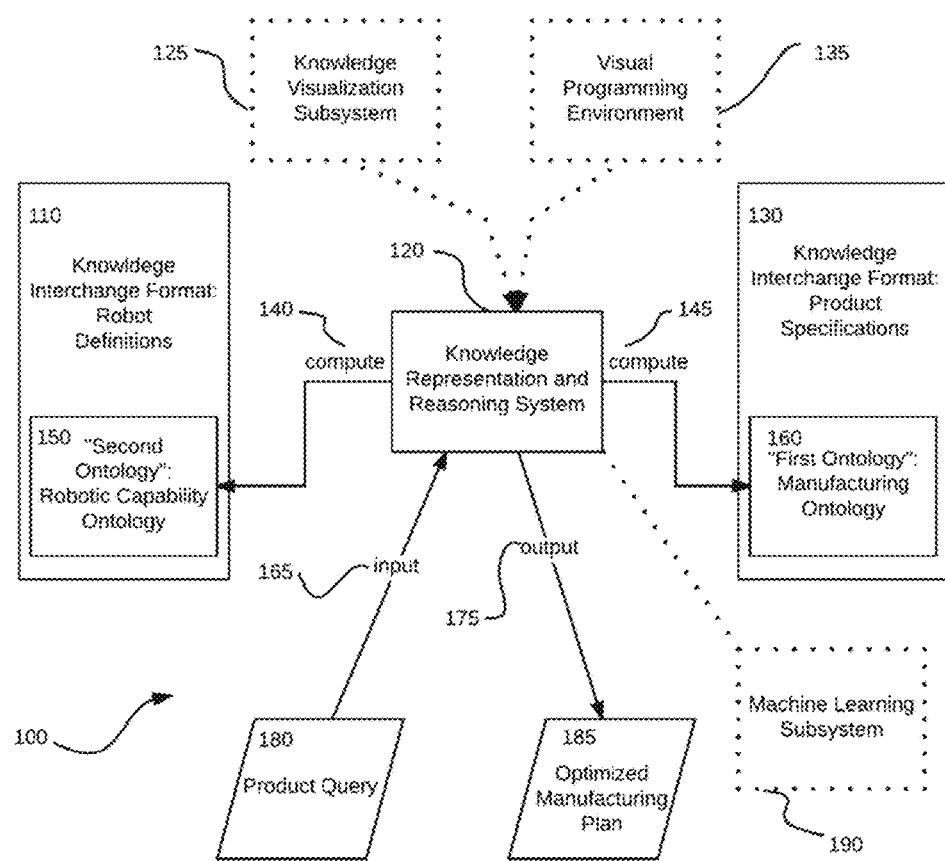
FIG. 1 is a diagram showing the components of the described technology in one embodiment of the present invention.

Referring to the system overview 100 of FIG. 1, the described technology employs a Knowledge Representation and Reasoning System 120 and optionally a Machine Learning Subsystem 190, coupled with a robotic capability ontology 150 and a manufacturing ontology 160. The robotic capability ontology 150 may optionally be formulated in Knowledge Interchange Format ("KIF") robot definitions 110. The manufacturing ontology 160 may optionally be formulated as Knowledge Interchange Format ("KIF") product specifications 130. Input 165 to the Knowledge Representation and Reasoning System 120 are product queries 180. Product Queries 180 are read by the Knowledge Representation and Reasoning System 120 which computes 145 through the Manufacturing Ontology 160 and further computes 140 through the Robotic Capability Ontology 150 the resulting outputs 175 and furnishes manufacturing plans 185 that satisfy the product specifications in the product queries 180. An optional Knowledge Visualization Subsystem 125 displays the robotic capability ontology 150 and the manufacturing ontology 160. Further, an optional Visual Programming Environment 135 allows visual manipulation of product designs by non-technical users.

Figure 2:
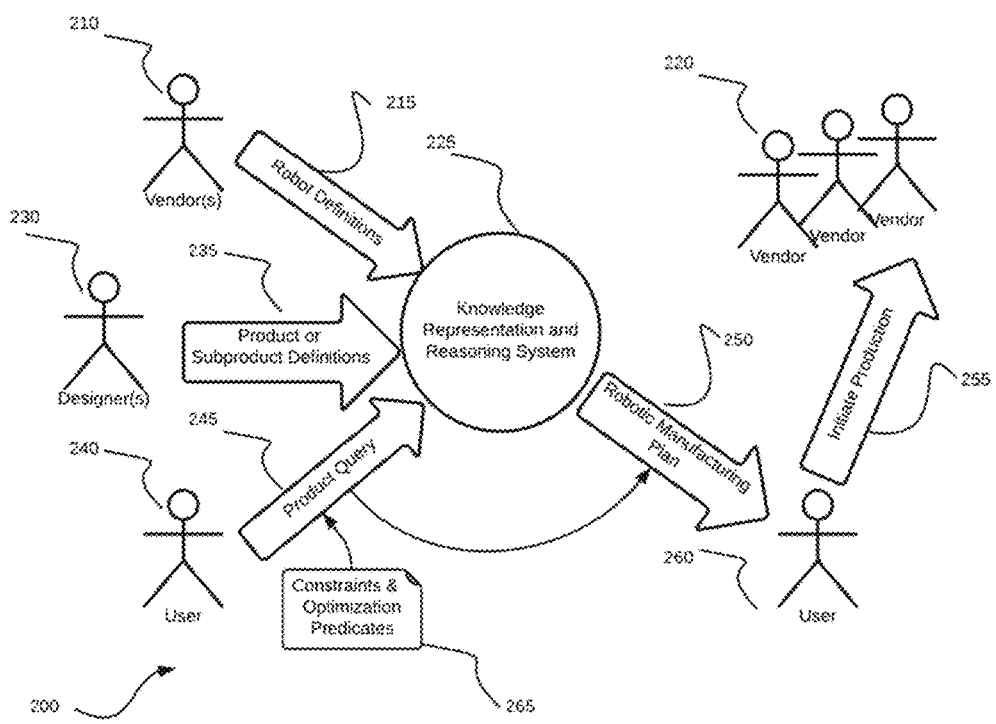
FIG. 2 is a use case diagram showing how users might interact with the described technology in one embodiment of the present invention.

FIG. 2 is a use case diagram 200 showing how users might interact with the described technology. Vendors 210 provide robotic capabilities (robotic definitions) 215 which are received by the Knowledge Representation and Reasoning System 225. Product designers 230 provide product and sub-product specifications 235 which are received by the Knowledge Representation and Reasoning System 225. A user 240 submits product queries 245 detailing constraints and optimizations 265 to the Knowledge Representation and Reasoning System 225. The user 240 may or may not be the same as the product designer 230. The Knowledge Representation and Reasoning System 225 then computes the manufacturing plan 250 and provides this to the user 260. User 240 may or may not be the same user as user 260. User 260 may then optionally initiate production 255 of the product according to the manufacturing plan with one or more vendors 220. Users 240 and 260 may or may not be human agents and may be robotic algorithms executing as computer software.

Figure 3:
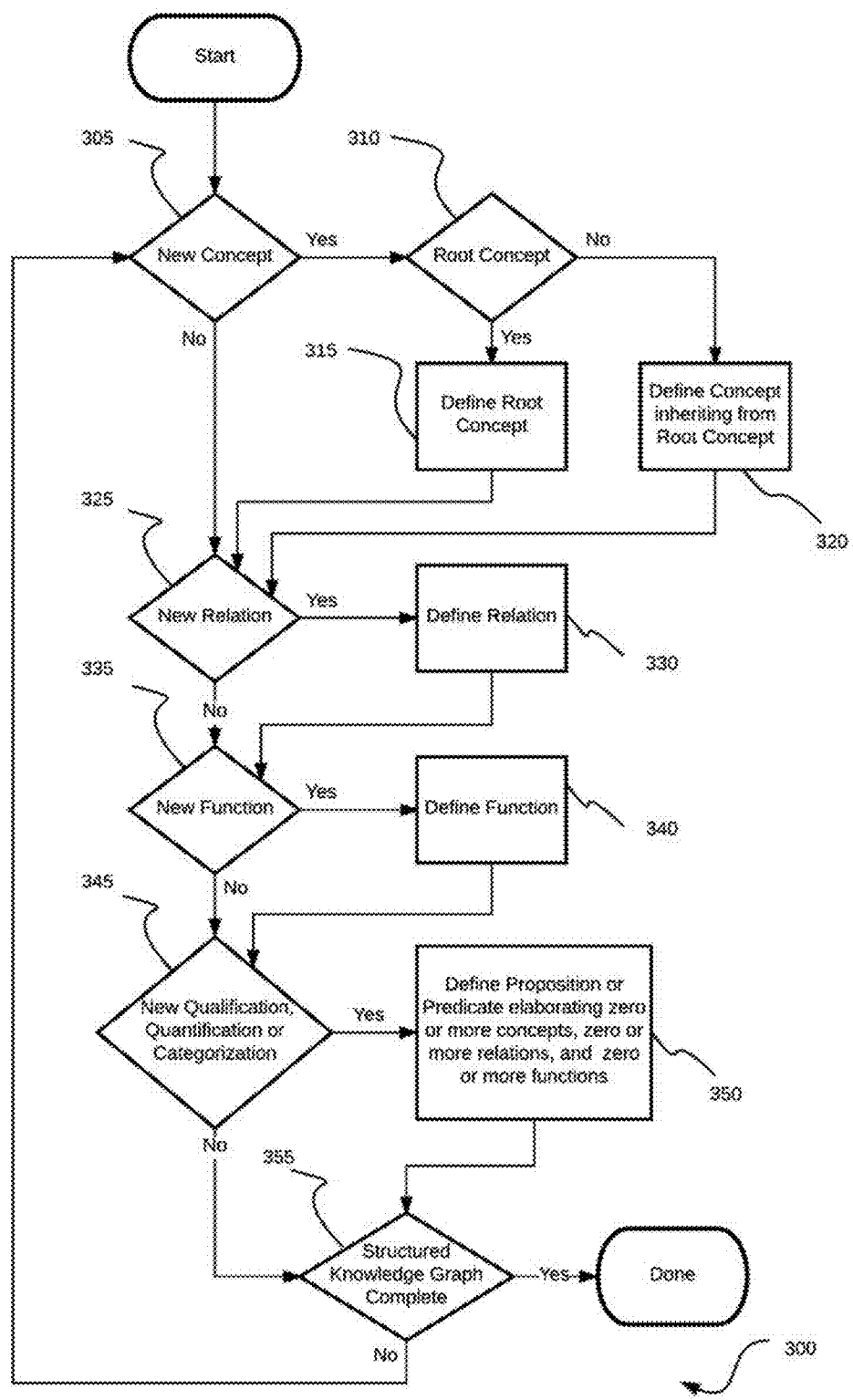
FIG. 3 is a flow diagram describing the definition of ontology as a structured knowledge graph in the described technology in one embodiment of the present invention.

FIG. 3 is a flow diagram 300 describing the definition of ontology as a structured knowledge graph in the described technology. The described technology comprises two ontologies: the robotic capability ontology and the manufacturing ontology. Each ontology is defined as follows. Step 305 decides if a new concept is to be created. If a new concept is to be created, step 310 decides if the new concept is a root concept, i.e. one without a parent concept, also referred to as a base concept. If the new concept is a root concept, the new concept is created as such 315. Table 3 shows an example of a root or base concept being defined. If the new concept is not a root concept, the new concept is defined in terms of its antecedent or parent concept 320. Table 4 shows examples of concepts defined in terms of their parent concepts. Those of ordinary skill in the in the art will recognize concepts defined in terms of their antecedents or parent concepts as semantics akin to object oriented inheritance and therefore akin to specialization and generalization, but different in that concepts are first class citizens of predicate calculus. This enables the system to reason about predicates and propositions in terms of specialization and generalization, which is a critical feature of building a knowledge graph, that can be computed. If a new relation is to be created 325, step 330 creates a new relation. Those of ordinary skill in the art will recognize relations as akin to relational database semantics, but different in that here relations are first class citizens of predicate calculus which become part of a knowledge graph, which can be computed. Relations assist in logical categorization and classification. Table 5 shows examples of relations being defined. If a new function is to be created 335, step 340 creates a new function. Those of ordinary skill in the art will recognize functions as akin to functional programming semantics, but different since here they are first class citizens of predicate calculus which become part of a knowledge graph, which can be computed. Table 15 shows an example of a function being defined. New qualifications, quantifications and categorizations may be defined 345 by defining propositions or predicates elaborating zero or more concepts, zero or more relations, and zero or more functions 350. Step 350 connects concepts, relations and functions in terms of predicate calculus through constructs such as universal and existential quantification. Table 16 demonstrates elaborating a relation through universal and existential quantification.

Figure 4:
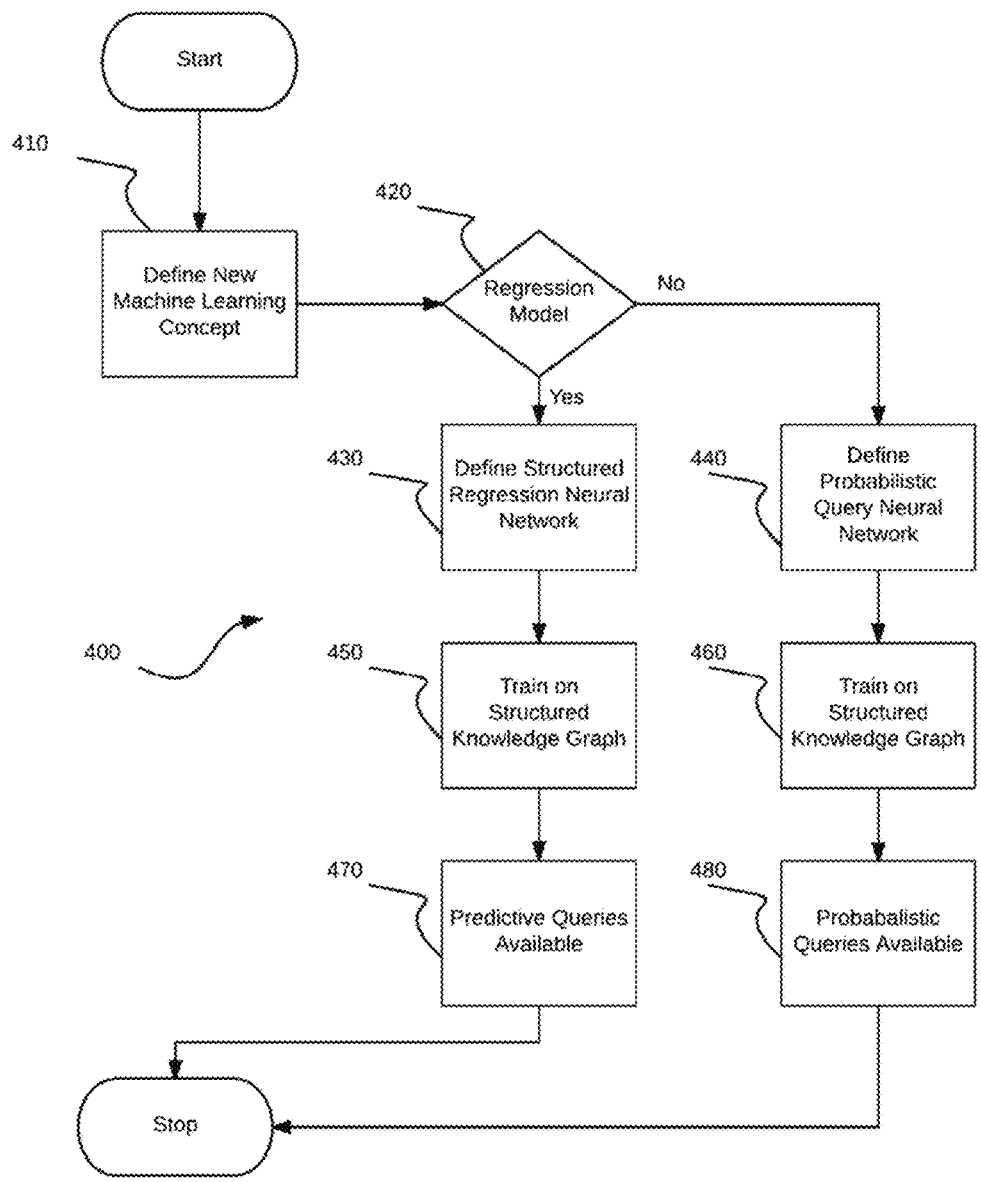
FIG. 4 is a flow diagram showing how machine learning is applied to a structured knowledge graph in the described technology in one embodiment of the present invention.

FIG. 4 is a flow diagram 400 describing how machine learning is applied to a structured knowledge graph in the described technology 410. If a regression model is to be created 420, step 430 defines a neural network across the structured knowledge graph. Table 34 demonstrates defining a neural network across a structured knowledge graph. Step 450 trains the neural network on sample data relating to the structured knowledge graph. Predictive queries are now available 470. Predictive queries can be used to approximate or predict properties for which otherwise no data has been recorded. Table 38 demonstrates an example of a predictive query. Crucially, predictive queries can also be used to quantify what impact changes in some properties will have on other properties. If no regression model is to be created 420, step 440 defines a probabilistic neural network. Step 460 trains the neural network on sample data relating to the structured knowledge graph. Probabilistic queries are now available 480. Probabilistic queries are useful in categorization and classification problems where relevant data is missing. Likewise, probabilistic queries can be used to determine how likely changes in one property will lead to changes in another. Predictive queries and probabilistic queries combine to be a powerful tool in optimizing for specific outcomes.

Figure 5:
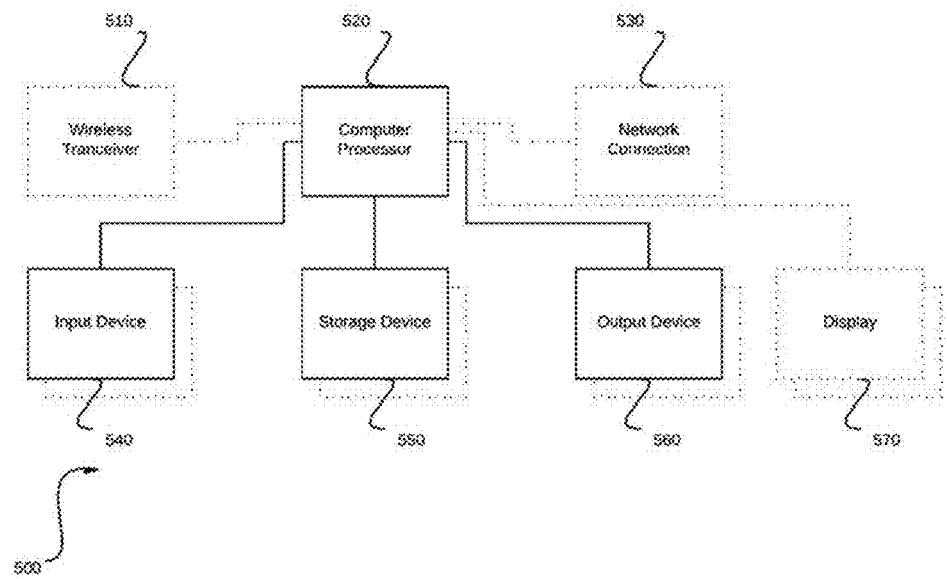
FIG. 5 is a hardware diagram showing components of a typical computer system on which the described technology executes in one embodiment of the present invention.

FIG. 5 and the following discussion provide a brief general description of a suitable computing environment in which aspects of the described technology can be implemented. Although not required, aspects of the technology may be described herein in the general context of computer-executable instructions, such as routines executed by a general—or special purpose data processing device (e.g. a server or client computer). Aspects of the technology described herein may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions; data structures, screen displays, and other data related to the technology may be distributed over the Internet or over other networks (including wireless networks) on a propagated signal on a propagation medium (e.g. an electromagnetic wave, a sound wave etc.) over a period of time. In some implementations, the data may be provided on any analog or digital network (e.g., packet-switched, circuit-switched, or other scheme).

The described technology can also be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Those skilled in the relevant art will recognize that portions of the described technology may reside on a server computer, while corresponding portions reside on a client computer (e.g., PC, mobile computer, tablet, or smart phone). Data structures and transmissions of data particular to aspects of the technology are also encompassed within the scope of the described technology.

Referring to FIG. 5, the described technology employs a computer 500, such as a personal computer, workstation, phone, or tablet, having one or more processors 520 coupled to one or more user input devices 540 and data storage devices 550. The computer 500 is also coupled to at least one output device 560, such as a display 570. The computer 500 may be coupled to external computers, such as via an optional network connection 530, a wireless transceiver 510, or both. For example, network hubs, switches, routers, or other hardware network components within the network connection 530 and/or wireless transceiver 510 can couple one or more computers 500.

The input devices 540 may include a keyboard and/or a pointing device such as a mouse. Other input devices are possible. The storage devices 550 may include any type of computer-readable media that can store data accessible to the computer 500, such as magnetic hard and floppy disk drives, optical disc drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to a node on a network, such as LAN, WAN, or the Internet (not shown in FIG. 5).

Figure 6:
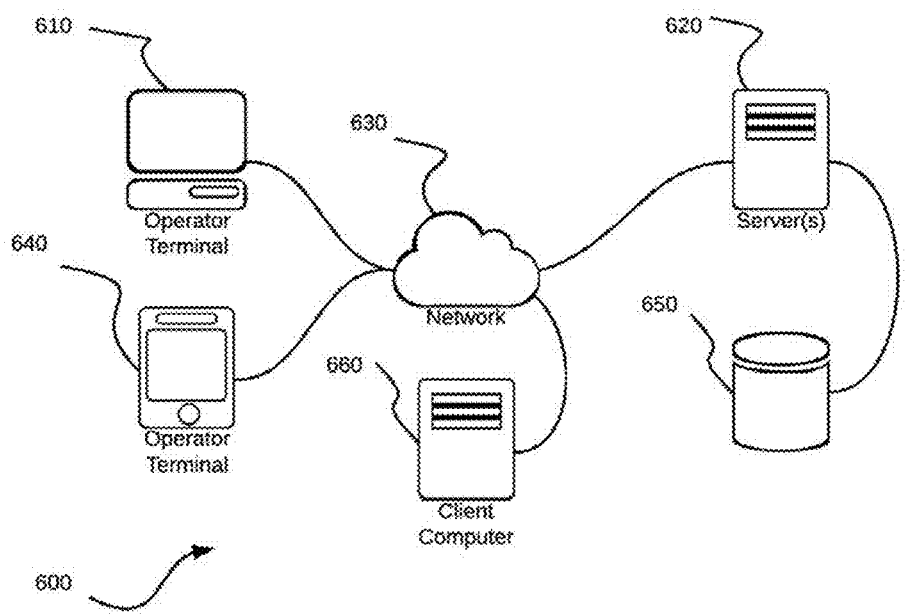
FIG. 6 is a diagram depicting an example environment within which the described technology may execute in one embodiment of the present invention.

FIG. 6 is a diagram illustrating an example environment 600 within which the described technology may operate. Environment 600 may include operator terminals (nodes) 610 and 640, client computers (nodes) 660 on a network 630 from which operators may enter robotic capabilities, product specifications or request and receive manufacturing plans for product specifications. Servers 650, in some embodiments, are dedicated or partially dedicated nodes that facilitate various aspects of the described technology. Servers 650 may also be coupled to one or more databases 620.

Figure 7:
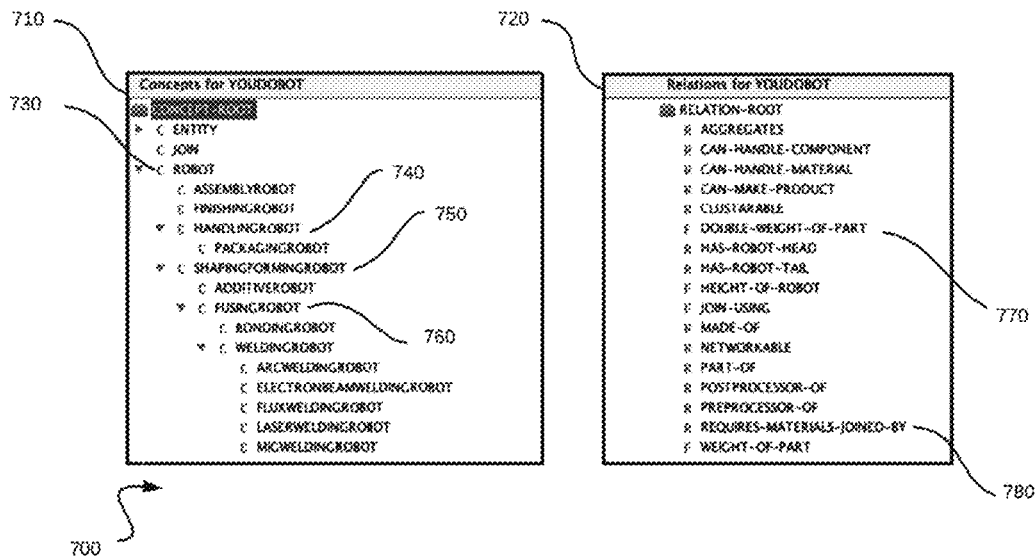
FIG. 7 shows an ontology hierarchy browser in one embodiment of the present invention.

FIG. 7 is a diagram illustrating an example ontology browser 700 within which the described technology may operate. The left box 710 displays a tree view of concepts with the root robot concept 730. Nodes 740, 750 and 760 show subordinate categorizations of robots that reflect their hierarchical structure. Relations include both mathematical relations 780 (prefixed with "R") and mathematical functions 770 (prefixed with "F").

Figure 8:
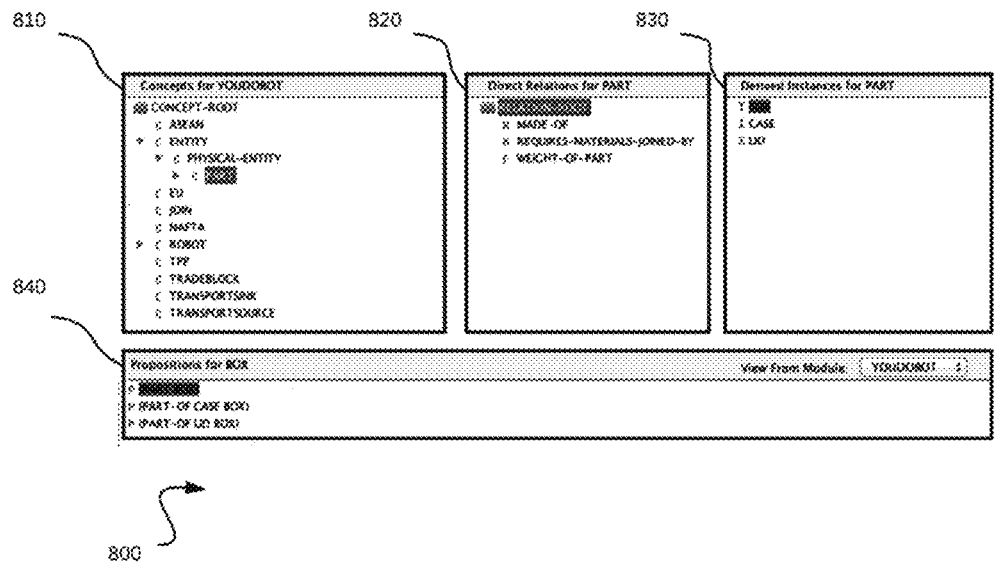
FIG. 8 shows a product graph in an ontology browser in one embodiment of the present invention.

FIG. 8 is a diagram is a diagram illustrating an example ontology browser 800 relating concepts 810 to relations 820 (both mathematical relations and mathematical functions), instances of concepts 830 (here instances of Part) and propositions (properties) of instances selected in the browser 840. Here the "Part" instance "Box" was selected and it was shown that "Case" and "Lid" are parts of "Box."

Figure 9:
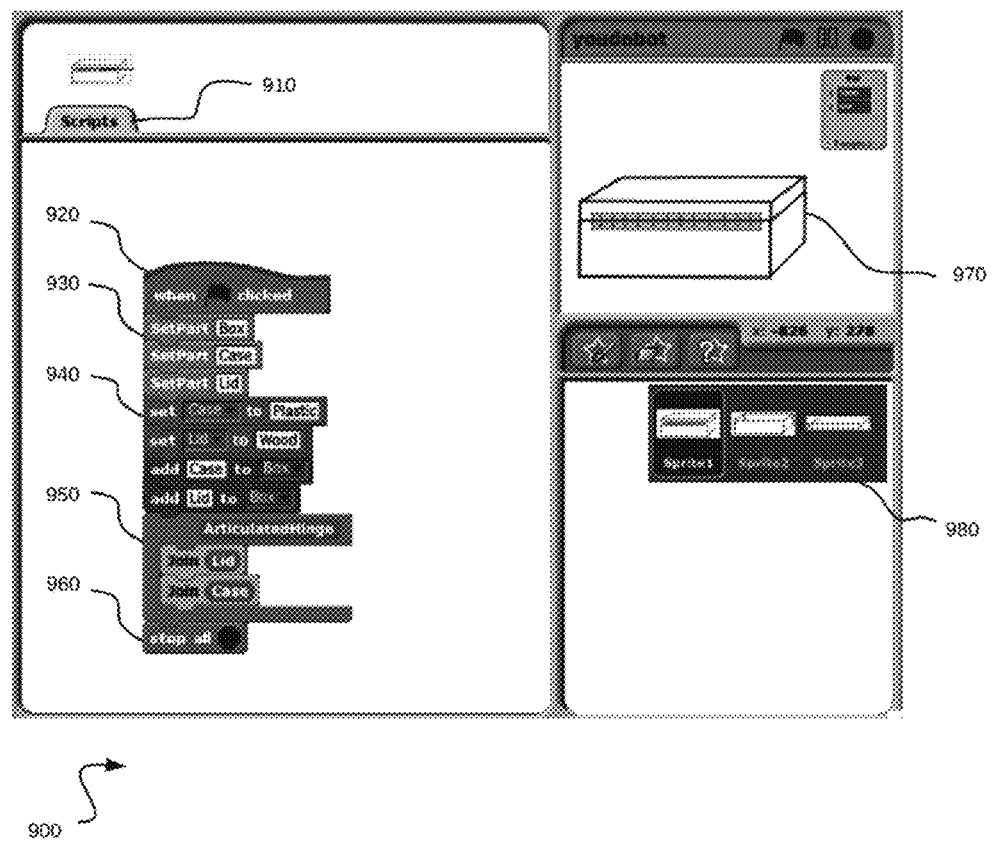
FIG. 9 shows visual product modeling using a domain specific language in one embodiment of the present invention.

FIG. 9 is a diagram illustrating an example visual programming model 900 of the Box from [0039] FIG. 8. The script 910 identifies the program. The pane 970 shows a visual rendering, or simulation, of the finished product. The pane 980 shows constituent parts. Steps 920 and 960 mark the beginning and end of the program. Steps 930, 940 and 950 reflect Knowledge Interchange Format descriptions as shown in tables 18; 19, 20 and 21. In steps 930, 940 and 950, the user is assisted through visual cues and only symbols or blocks can be connected that result in syntactically correct constructs. To this end, the external contours of symbols or blocks representing syntactic elements are shaped like puzzle pieces, allowing only matching pieces to be joined.

Knowledge Representation & Reasoning

The system described is termed youdobot.net, which implements a Knowledge Representation & Reasoning System. A person of ordinary skill in the relevant art will understand that the present disclosure may be implemented using other knowledge representation & reasoning systems without departing from the spirit or scope of the present disclosure.

The Knowledge Interchange Format (KIF) in a dialect of the programming language Lisp is used to specify information in a way that a knowledge representation and reasoning system may consume it. Source code shown in tables of the present disclosure employs this dialect of the Lisp programming language. Unlike a relational database, a knowledge representation and reasoning system is fundamentally optimized to define and process rules of inference. Being "optimized to define and process" is also referred to as being a "first class citizen" of an information system. In this vein, inference is a "first class citizen" of a knowledge representation and reasoning system. This leads to an important distinction from traditional database technology. With a relational database, a human must understand and reason about the database schema by formulating queries that reason about the data in the schema. If constraints are to be defined, these are embedded in queries in the form of predicates. In this knowledge representation and reasoning system, by contrast, predicates are an integral part of what would be a schema in a relational database. This gives rise to a key strength of a knowledge representation and reasoning system: The human user may directly query conclusions—without necessarily understanding or having to explicitly specify intermediate logic. This constitutes automated reasoning.

Robotic Capability Ontology

The robotic capability ontology defines a catalog or registry of robotic capabilities with a view towards assigning tasks in a sequence of manufacturing steps to individual robots. In order to do this, the system must firstly define what types of robots exist. The categorization hierarchies in tables 1 and 2 illustrate this.

TABLE 1

Robot Classification Hierarchy
Robot

| Assembly | Finishing | Handling | ShapingForming | Textile |
|---|---|---|---|---|
| Riveting | Polishing | Packaging | Additive | Sewing ... |
| Bonding | Painting | Conveying | Subtractive | Ironing |
| ... | Brushing ...... | | Injection Molding | ... |
| | | | Fusing ... | |

TABLE 2

Subordinate Robot Classification Hierarchy
Fusing

| Welding | Soldering |
|---|---|
| Arc | Soft ... |
| Electron | Hard |
| Flux | Induction |
| Laser | ... |
| Mig | |
| Plasma | |
| Spot | |
| ... | |

An elaboration of how the hierarchy from table 1 may be represented in Knowledge Interchange Format is shown in table 3.

TABLE 3

Base Robot Concepts

```
;; Base Robot Concept
;;================
(defconcept Robot (?r)
    :documentation "The concept of ROBOT beings")
;; Level 2 Robot Concepts
;;==================
(defconcept AssemblyRobot (?r Robot)
    :documentation "True if ?r assembles product components into a
    product")
(defconcept HandlingRobot (?r Robot)
    :documentation "True if ?r handles products, e.g. moving them ")
(defconcept FinishingRobot (?r Robot)
    :documentation "True if ?r applies a finish to products, e.g.
    polishing")
(defconcept ShapingFormingRobot (?r Robot)
    :documentation "true if ?r is a robot that shapes or forms material")
(defconcept TextileRobot (?r Robot)
    :documentation "true if ?r is a robot that processes textiles")
```

Likewise concept categories may be refined in the hierarchy with subcategories.

TABLE 4

Subordinate Robot Concepts

```
;; Level 3 Robot Concepts
;;=====================
(defconcept AdditiveRobot (?r ShapingFormingRobot)
    :documentation "true if ?r is an 3D printing/additive manufacturing
    robot")
(defconcept SubtractiveRobot (?r ShapingFormingRobot)
    :documentation "true if ?r is a milling, drilling, machining etc.
    robot")
(defconcept FusingRobot (?r ShapingFormingRobot)
    :documentation "true if ?r is a robot that fuses components, e.g.
    welding")
(defconcept SewingRobot (?r TextileRobot)
    :documentation "true if ?r is a robot that sews textiles")
(defconcept PackagingRobot (?r HandlingRobot)
    :documentation "true if ?r is a robot that packages materials")
;; Level 4 Robot Concepts
;;=====================
(defconcept WeldingRobot (?r FusingRobot)
    :documentation "true if ?r is a welding robot")
(defconcept BondingRobot (?r FusingRobot)
    :documentation "true if ?r is a robot that bonds components, e.g.
    gluing")
```

Relations may be defined between categories.

TABLE 5

Robot Category Relations

```
;; Robot relations
;;================
(defrelation preprocessor-of ((?r1 Robot) (?r2 Robot))
    :documentation "True if ?r1 is a preprocessor of ?r2")
(defrelation postprocessor-of ((?r1 Robot) (?r2 Robot))
    :documentation "True if ?r1 is a postprocessor of ?r2")
(defrelation can-handle-material ((?r Robot) (?m Physical-Entity))
    :documentation "True if Robot ?r can handle Physical-Entity ?m")
(defrelation can-handle-component ((?r Robot) (?c Component))
    :documentation "True if Robot ?r can handle Component ?c")
```

Unary relations are defined as shown below.

TABLE 6

Robot Unary Relations

;; Unary relations
(defrelation networkable ((?r Robot))
    :documentation "True if ?r is networkable")

Characteristic of this method is the hierarchical specialization of concepts and their relational classification. At this point, it is possible to browse the robotic hierarchy in what is termed an "ontology browser." Please refer to FIG. 7.

Figure 13:
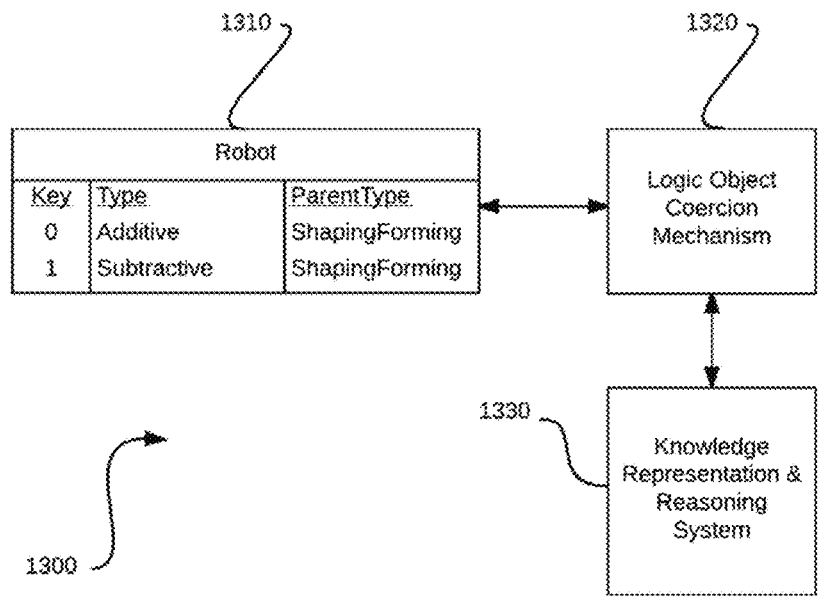
FIG. 13 is a block diagram describing database entity to logic object type coercion mechanism in one embodiment of the present invention.
Figure 14:
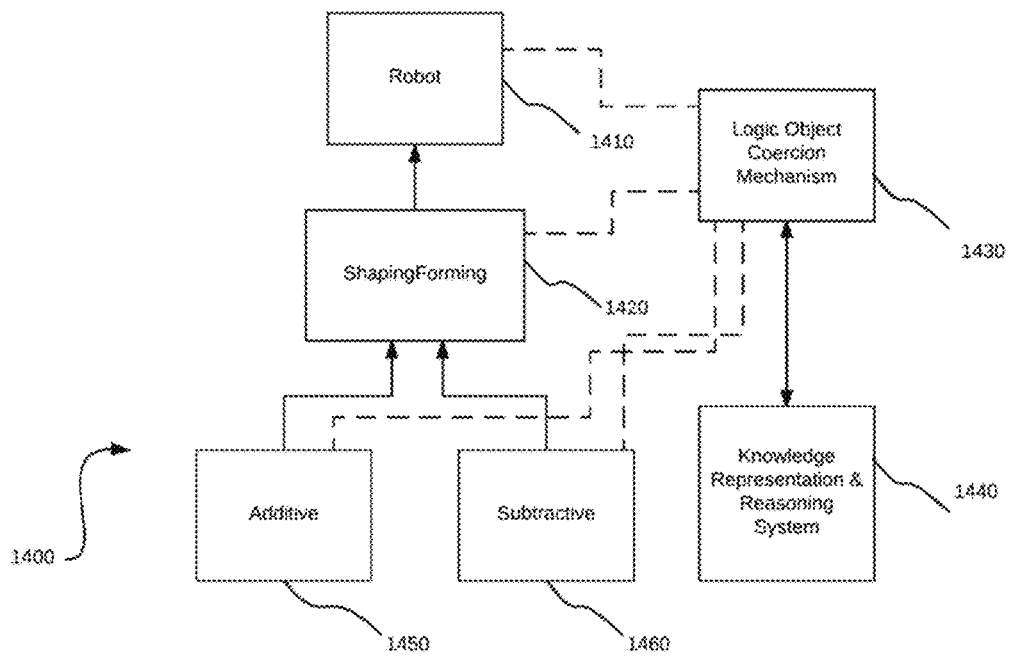
FIG. 14 is a block diagram describing MIL class to logic object type coercion mechanism in one embodiment of the present invention.

We have shown the source code of the robotic capability ontology which is instrumental in a] demonstrating what is characteristic of the model and b] relating robotic capabilities to products and eventually to the Manufacturing Ontology. The robotic capability ontology has been described in terms of the Lisp dialect KIF. KIF may be .entered through an interactive session by a human operator or client software or KIF may be read from one or more files and/or stored in one of more files. Alternate representations of the robotic capability ontology include reading aspects of the ontology from and storing it in a relational database or representing it in an object oriented class model. As described in paragraph [0043], relational databases are not optimized for inference. Likewise, the object oriented class model is not optimized for inference. Nevertheless, both object orientation and the relational database model may be used to persist at least part of the robotic capability ontology through a "Logic Object Coercion Mechanism." Persons of ordinary skill in the art will know this also as "type casting." To persist the robotic capability ontology in either a relational database or a UML class model, also referred to as an object oriented model, all types must be convertible to logic objects. FIG. 13 illustrates an environment 1300, where a relational database "Robot" entity 1310 is being adapted through a Logic Object Coercion Mechanism 1320 and ingested by a Knowledge Representation & Reasoning System 1330. FIG. 14 illustrates an environment 1400, where a class hierarchy expressed in UML notation is being adapted through a Logic Object Coercion Mechanism 1430 and ingested by a Knowledge Representation & Reasoning System 1440. A root class Robot 1410 is being specialized by a child class Shaping-Forming 1420, which is in turn specialized by Additive 1450 and Subtractive 1460. Classed 1410, 1420, 1450 & 1460 are being promoted to logic objects by a Logic Object Coercion Mechanism 1430. Expressing an ontology as illustrated in FIG. 14 based on UML Is less optimal than the KIF based representation for reasons explained in paragraph [0081]. Likewise, expressing an ontology as illustrated in FIG. 13 based on relational entities is less optimal than the KIF based representation for reasons explained in paragraph [0043]. Both the UML and relational entity approach are included here for the sake of completeness with the Logic Object Coercion Mechanism offered as a means to mitigate disadvantages of the respective approaches.

Tables 7 and 8 demonstrate the process described in FIG. 13.

TABLE 7

Relational Representation of Robots -
Robots represented by Character Strings

```
mysql> show tables;
+---------------------+
| Tables_in_youdobot  |
+---------------------+
| robot               |
+---------------------+
1 rows in set (0.00 sec)
mysql> describe robot;
+---------+-------------+------+-----+---------+-------+
| Field   | Type        | Null | Key | Default | Extra |
+---------+-------------+------+-----+---------+-------+
| rtype   | varchar(20) | YES  |     | NULL    |       |
| parent  | varchar(20) | YES  |     | NULL    |       |
+---------+-------------+------+-----+---------+-------+
2 rows in set (0.01 sec)
mysql> select * from robot,
+----------------+----------------+
| rtype          | parent         |
+----------------+----------------+
| Robot          |                |
| ShapingForming | Robot          |
| Additive       | ShapingForming |
| Subtractive    | ShapingForming |
+----------------+----------------+
4 rows in set (0.00 sec)
mysql>
```

TABLE 8

Source Code: Logic Object Coercion
Mechanism - KIF Type Coercion

```
PL-USER |= (defdb mydb
     :sql-database true
     :jdbc-connection-string
"jdbc:mysql://localhost:3306/youdobot?user=u&password=p")
|i|MYDB
PL-USER |= (retrieve 4 (rdbms/query-database mydb
     "select rtype from robot" ?r))
There are 4 solutions so far:
  #1: ?R=|Robot|
  #2: ?R=|ShapingForming|
  #3: ?R=|Additive|
  #4: ?R=|Subtractive|
;;
;; Note that KIF has cast the character strings from the
;; database to logic objects, denoted by the vertical bars.
;; This is called coercion in KIF.
;; We can turn coercion off.
PL-USER |= (retrieve 4 (?r string)
     (rdbms/query-database mydb
     "select rtype from robot" ?r))
There are 4 solutions so far:
  #1: ?R="Robot"
  #2: ?R="ShapingForming"
  #3: ?R="Additive"
  #4: ?R="Subtractive"
;; Note that KIF has now retained the native character
;; string types, denoted by the double quotes surrounding
;; "Robot", "ShapingForming", "Additive", and "Subtractive".
```

Manufacturing Ontology

The Manufacturing Ontology defines concepts underlying products and their manufacture. Like the Robotic Capability Ontology, the Manufacturing Ontology utilizes the Knowledge Interchange Format, KIF, but its specification encompasses concepts, relations, functions as well as full predicate calculus.

TABLE 9

Manufacturable Product Concepts

```
;; Manufacturable Product Concepts
;;==================================
(defconcept Entity (?e)
        :documentation "The concept of an unqualified thing/matter")
(defconcept Physical-Entity (?e Entity)
        :documentation "A physical entity is a quantifiable entity, e.g, one
         with size.")
(defconcept Non-Physical-Entity (?e Entity)
        :documentation "A non physical entity without mass; for example,
         a polish.")
(defrelation part-of ((?x Physical-Entity) (?y Physical-Entity))
        :documentation "True if ?x is a part of ?y.")
(defrelation aggregates ((?x Physical-Entity) (?y Physical-Entity))
        :documentation "True if ?x is made up of ?y.")
```

Table 9 defines entities and physical entities. We also establish that physical entities may be related by being part of or aggregating one another. It has yet to be defined what that means. For this we introduce rules of implication. The first rule combines mathematical quantification (forall) with implication (=>).

TABLE 10

Part-of Concept

```
;; Define the part-of concept
;;==================================
;; If x is a part of y then y aggregates x
;; Note that part-of is not transitive.
(assert (forall ((?x Physical-Entity) (?y Physical-Entity))
      (=> (part-of ?x ?y)
          (aggregates ?y ?x))))
```

What the rule in table 10 says is that any one (x) which is part of another (y), the other part (y) aggregates the one (x). Therefore "part-of" is the inverse of "aggregates" The implication is non-transitive. But aggregates can be transitive. That is how composites are created.

TABLE 11

Transitive Concepts

```
;; Transitivity: If `?x' aggregates `?y' and `?y' aggregates `?z' then `?x'
aggregates `?z'.
;; This is the chain rule of implication used to construct recursion. This
;; rule is recursive, since its consequent (or head) defines an 'aggregates'
;; relationship by recursively referencing 'aggregates' in its antecedent
(or tail).
(assert (forall ((?x Physical-Entity) (?z Physical-Entity))
      (=> (exists (?y Physical-Entity)
          (and (aggregates ?x ?y)
               (aggregates ?y ?z)))
      (aggregates ?x ?z))))
```

Above we are formulating a rule based on universal quantification (forall), implication (=>) and additionally existential quantification (exists). What we are saying is that for all x and z where a y exists such that x aggregates y and y aggregates z then x also aggregates z. This means no direct relationship between x and z needs to be specified. It is now inferable—and this inference will work no matter how many intermediate aggregates connect x and z, because the rule is, in computer science terms, "recursive."

We now proceed to distinguish between part-of and Part since at any point in time a Part, while intended for a whole, may not be part-of a whole. Further we define made-of to be single valued (axiom single-valued). This is because we will define composites separately. See tables 12 and 13.

TABLE 12

Made-of Concept

```
;; The concept of a part: We try to distinguish this from the relationship
;; part-of in that a part may not at any point in time be part of anything.
;; We call things parts that are intended to function integrated in some-
thing
;; else yet spend part of their life cycle not integrated in that something
;; else. For example, a light bulb fulfills a purpose in a lamp, but if spare
;; may exists outside of that context. Hence a part may not be "part of."
(defconcept Part (?part Physical-Entity)
        :documentation "A part is a thing that fulfills a greater purpose
         partially")
(defrelation made-of ((?p Part) (?m Physical-Entity))
        :documentation "True if Part ?p is made of Physical-Entity ?m."
        :axioms ((single-valued made-of)))
```

In table 13 we define composites to be wholes composed of more than one Part. Firstly, we define the concept of a Composite to be a specialization of Part. Secondly we define a rule, which asserts that when the cardinality of the aggregates relation involving any x is at least two (range-cardinality-lower-bound), then x is a Composite. Because Composites are Parts, x must also be a Part. The specification is shorter than it's explanation.

TABLE 13

Composite Concept

```
;; Concept of a composite:
;; must have at least two parts
(defconcept Composite (?p Part))
(assert (forall ?x
      (=> (range-cardinality-lower-hound aggregates ?x 2)
          (Composite ?x))))
```

At last we are equipped to define the Component that we saw in the earlier section. It is hoped that the definition is intuitive. Please refer to the comments in the code.

TABLE 14

Component Concept

```
;; A Component is a part such that there exists a whole that aggregates it
;; in a way that there are at least two parts aggregated by that whole.
(defconcept Component (?p Part)
        :documentation "A part of something; not the whole;
         having two or more Physical-Entities or other Components"
        :<=> (exists (?whole)
              (and (aggregates ?whole ?p)
                   (Composite ?whole))))
```

It is necessary to link the Manufacturing Ontology with the Robotic Capability Ontology in order to support a use case of automated reasoning assisted product design. Individual robots have specific capabilities. For example, we defined assembly robots to include bonding, and fusing robots to include welding. These are methods to "join" parts, but we have yet to introduce that concept.

In table 15 we define the concept Join in terms of a set and define a function join-using that maps any two Components to a Join.

TABLE 15

Join Concept

```
(defconcept Join (?j)
      :<=> (member-of ?j (setof
             WELD
             GLUE
             NAIL
             STAPLE
             SCREW
             ARTICULATED-HINGE
             STITCH
             RIVET
             )))
(deffunction join-using ((?x Component) (?y Component)) :->(?j Join))
```

We are now equipped to define the requires-materials-joined-by relation. Consider the case of a robot that can glue to support a particular Join, but which cannot glue any arbitrary two materials. Perhaps only wood can be glued onto wood, but not onto metal. This is one example of enforcing constraints. We define requires-materials-joined-by as shown in table 16.

TABLE 16

Requires Materials Joined By Relation

```
(defrelation requires-materials-joined-by ((?x Part)
                  (?m1 Physical-Entity)
                  (?m2 Physical-Entity)
                  (?j Join)))
(assert (forall ((?whole Part) (?m1 Physical-Entity) (?m2 Physical-Entity)
(?j Join))
       (=> (exists ((?c1 Component) (?c2 Component))
           (and (aggregates ?whole ?c1)
                (aggregates ?whole ?c2)
                (made-of ?c1 ?m1)
                (made-of ?c2 ?m2)
                (= (join-using ?c1 ?c2) ?j)))
           (requires-materials-joined-by ?whole
                      ?m1
                      ?m2
                      ?j))))
```

What the above says is define a relation requires-materials-joined-by. Then assert that for all wholes and any two physical entities (m1 & m2) and a join (j) the following must hold true: Where two components exist, which are aggregated by the whole and are made of m1 & m2 and where the join function taking the components as arguments produces j, then what is implied is that the relation requires-materials-joined-by is true.

In the introduction we said that inference rules could be applied directly within data definitions—the "schema." This is one example of that method.

This method becomes useful in that the definition of a product, we will see this later, as a composite forms what computer scientists call a "graph". A query of this product using requires-materials-joined-by, then mimics what the computer science discipline of functional programming calls a "destructuring pattern match." The pattern match "parses" the product structure, the graph, and produces results satisfying the pattern, here a relation. Unlike in a conventional programming language, no additional code needs to be written to actively perform this pattern match within a function. Rather, the conclusions of the computation may be queried directly.

In this way, we are able to unify aspects of object orientation (hierarchical specialization), functional programming (pattern-match-style graph-destructuring), relational database concepts (relations) and rules of logic (predicate calculus) into one holistic model that enables automated reasoning. As described in paragraph [0051] with respect to the Robotic Capability Ontology, particular aspects of the Manufacturing Ontology may likewise be persisted (stored in and/or read form) using a class model or a relational model based representation.

Materials are defined as shown in table 17.

TABLE 17

Example Materials Defined

```
;;===================
;; Materials List
;;===================
(assert (Physical-Entity plastic))
(assert (Physical-Entity wood))
(assert (Physical-Entity paper))
(assert (Physical-Entity cardboard))
(assert (Physical-Entity steel))
(assert (Physical-Entity glass))
(assert (Physical-Entity rubber))
(assert (Physical-Entity brass))
```

We are now ready to link robots to materials they can handle and link assembly robots, in particular, to join methods they support.

Product definitions are now possible in terms of the ontology we have established. In this method, products form what is called a "directed graph" defining their components, any materials used and means of assembly.

We begin by asserting materials, plastic and wood as well as defining Parts case and lid towards construction of a box.

TABLE 18

Example Product Materials and Associated Parts

```
(assert (Physical-Entity plastic))
(assert (Physical-Entity wood))
(assert (Part case))
(assert (Part lid))
```

Now we define the materials of which case and lid are made.

TABLE 19

Example Product Materials Continued

```
(assert (made-of case plastic))
(assert (made-of lid wood))
```

Next we define the box. This builds our product as a directed graph.

TABLE 20

Example Product Definition as Directed Graph

```
(assert (Part box))
(assert (part-of lid box))
(assert (part-of case box))
```

Lastly, for our limited example, we define the method of construction.

TABLE 21

Example Product Method of Construction (assert (= (join-using case lid) ARTICULATED-HINGE))

An articulated hinge joins case and lid.

We may now browse our knowledge base in an ontology browser. The illustration below shows navigating to the Part entity and browsing box, case and lid. The "Propositions for Box" pane shows what a box is. It is a part. Case and lid are its parts. Please refer to FIG. 8.

Likewise we may query what is part of a box programmatically:

TABLE 22

Querying Product Components

STELLA> (retrieve all (?x) (aggregates box ?x))
;There are 2 solutions:
;#1: ?X=CASE
;#2: ?X=LID Automated Reasoning We can also ask the system to reason about our box. One thing we have not explicitly stated is whether a box is a Composite. But recall that our definition of Composite was an aggregate with 2 or more parts. If one needs to know, one can simply issue the (why) command.

TABLE 23

Explaining Propositions

STELLA> (ask (Composite box))
TRUE
STELLA> (why)
1 (COMPOSITE BOX)
  follows by Modus Ponens
  with substitution {?x/BOX}
  since 1.1 ! (FORALL (?x)
       (<= (COMPOSITE ?x)
           (RANGE-CARDINALITY-LOWER-BOUND
AGGREGATES ?x 2)))
  and 1.2 (RANGE-CARDINALITY-LOWER-BOUND
AGGREGATES BOX 2) 1.2 (RANGE-CARDINALITY-LOWER-
BOUND AGGREGATES BOX 2)
  follows by Modus Ponens
  with substitution {?v05/2, ?lb/2, ?i/BOX, ?r/AGGREGATES}
  since 1.2.1 ! (FORALL (?r ?i ?lb)
       (<= (RANGE-CARDINALITY-LOWER-BOUND ?r ?i ?lb)
           (EXISTS (?v05)
            (AND (BOUND-VARIABLES ?r ?i ?lb)
              (= (RANGE-MIN-CARDINALITY ?r ?i) ?v05)
              (=< ?lb ?v05)))))
  and 1.2.2 (BOUND-VARIABLES AGGREGATES BOX 2)
  and 1.2.3 (= (RANGE-MIN-CARDINALITY AGGREGATES BOX)
  2) and 1.2.4 (=< 2 2)
...

As the excerpt shows, we may even ask the system to explain why it thinks that a box is a Composite. The astute mathematician will note that part of the proof has been elided. Enough of the full proof has been shown to demonstrate the reasoning capabilities of the system.

Most importantly, we want to know how to build our box. What materials will need to be joined onto what others and how?

TABLE 24

Querying Product Materials and Means of Construction

STELLA> (retrieve all (?m1 ?m2 ?j)
    (requires-materials-joined-by box ?m1 ?m2 ?j))
There is 1 solution:
1: ?M1=PLASTIC, ?M2=WOOD, ?J=ARTICULATED-HINGE The "retrieve all" command has triggered the parsing of the product graph for box and all relations satisfying the requires-materials-joined-by predicate have been identified. Free variables m1, m2, j have been filled in. Of interest is the "SQL style" declarative nature of this command. Yet there are no data tables. Instead, a graph based data structure has been parsed and processed—a task familiar to computer programmers as procedural rather than declarative. Traditionally this is where computer programmers spend and lose their development time: Data structures are defined—declaratively. Then procedural algorithms are constructed to parse and process them. Finally, the data model changes and the algorithms must be re-written—or vise versa. Likewise, in a data driven model, such as a relational database, stored procedures assume the role of the algorithm. This disjoin requires a human domain expert to use understanding of the data model & algorithm. This understanding is codified in procedures, which themselves cannot be reasoned about algebraically. The esteemed mathematician E. W. Dijkstra called this "operational reasoning" and considered it "to be one of the main causes of the persistence of the software crisis." The technology described in the present disclosure solves this problem.

Characteristic of the implementation we have presented here is that concepts are described in terms of predicate calculus and that relational and functional concepts are integrated in a way that the system can reason about itself. Computations are produced without explicitly traversing and parsing the data model.

Deducing Manufacturing Plans

Robot definitions allow connecting knowledge of how to build products to deducing manufacturing plans. We begin by defining robots.

TABLE 25

Example Robot Definitions

;;=======================
;; Sample Robot Definitions
;;=======================
;; A 3D Printer, not otherwise qualified
(assert (Robot 3dprinter))
;; A box assembly robot that can handle wood, plastic and steel
;; using hinges, rivets and staples
(assert (AssemblyRobot boxmakerbot))
(assert (can-handle-material boxmakerbot wood))
(assert (can-handle-material boxmakerbot plastic))
(assert (can-handle-material boxmakerbot steel))
(assert (can-join-using boxmakerbot ARTICULATED-HINGE))
(assert (can-join-using boxmakerbot RIVET))
(assert (can-join-using boxmakerbot STAPLE))
;; WhoIsBaxter
(assert (HandlingRobot whoisbaxter)) ; WhoIsBaxter is versatile
(assert (FinishingRobot whoisbaxter)) ; Illustration given to show that
(assert (AssemblyRobot whoisbaxter)) ; multiple categorizations are
allowed
;; A fusing robot that can glue components
(assert (FusingRobot stickerbot))
(assert (can-handle-material stickerbot wood))
(assert (can-handle-material stickerbot brass))
(assert (can-join-using stickerbot GLUE))

We have already seen the relation requires-materials-joined-by. We modify this slightly to accommodate robots and define the requires-materials-joined-by-robot.

TABLE 26

Mapping Means of Construction onto Robots

```
;; Define requires-materials-joined-by-robot relation
(defrelation requires-materials-joined-by-robot ((?x Part)
                        (?m1 Physical-Entity)
                        (?m2 Physical-Entity)
                        (?j Join)
                        (?r Robot)))
  (assert (forall ((?whole Part)
          (?m1 Physical-Entity)
          (?m2 Physical-Entity)
          (?j Join)
          (?r Robot))
    (=> (exists ((?c1 Component) (?c2 Component))
         (and (aggregates ?whole ?c1)
              (aggregates ?whole ?c2)
              (made-of ?c1 ?m1)
              (made-of ?c2 ?m2)
              (= (join-using ?c1 ?c2) ?j)
              (can-handle-material ?r ?m1)
              (can-handle-material ?r ?m2)
              (can-join-using ?r ?j)
         ))
         (requires-materials-joined-by-robot ?whole
                          ?m1
                          ?m2
                          ?j
                          ?r))))
```

Feasibility Analysis

Before we asked what materials will need to be joined onto what others and how? Now it is possible to ask what robot can provide this service to establish if the design is feasible. If there are no solutions, the design is not feasible. If the query finds solutions, the design is feasible.

TABLE 27

Querying Robots Required to Construct a Product

```
STELLA> (retrieve all (?m1 ?m2 ?j ?r)
         (requires-materials-joined-by-robot box ?m1 ?m2 ?j ?r))
There is 1 solution:
#1:    ?M1=PLASTIC,
       ?M2=WOOD,
       ?J=ARTICULATED-HINGE,
       ?R=BOXMAKERBOT
```

Our design is feasible. We will require the "boxmakerbot" robot. It is worth noting that this automated exploration of feasibility supports not only queries by human operators, but also permits software assisted product design. Thus, where traditionally supply models utilized a strategy bringing branded products to consumers, the method presented here is designed to support a pull supply chain model that sees bespoke products composed from capabilities. Manufacturers become vendors of capabilities. See overleaf for more manufacturing plans.

The next paragraph is intended to show how compositional the system is and to demonstrate the concept of a manufacturing plan. A manufacturing plan details what robots are needed to complete a product requiring multiple manufacturing steps—and possibly the order of steps. The steps below illustrate an elaboration of the box design.

Define a plaque;
Make it from brass.
Then add it to the box and
glue it to the lid.

Shown below is our definition.
Note how the "code" models the structure of the English description that we just gave.

TABLE 28

Extending the Example Product Definition

```
(assert (Part plaque))
(assert (made-of plaque brass))
(assert (part-of plaque box))
(assert (= (join-using lid plaque) GLUE))
```

Finally, we ask the system to produce a manufacturing plan.

TABLE 29

Computing a Manufacturing Plan

```
STELLA> (retrieve all (?m1 ?m2 ?j ?r)
         (requires-materials-joined-by-robot box ?m1 ?m2 ?j ?r))
There are 2 solutions:
#1:    ?M1=WOOD, ?M2=BRASS, ?J=GLUE, ?R=STICKERBOT
#2:    ?M1=PLASTIC,
       ?M2=WOOD,
       ?J=ARTICULATED-HINGE,
       ?R=BOXMAKERBOT
```

Non Physical Entities

We can easily extend the model to add processing steps that include non-physical entities. We never mentioned why materials are modelled as physical entities—to allow them to be composed transparently with manufacturing steps involving non physical entities. For example we might imagine that the brass plate would be "composed" with a polish. In that case, the polish is a non physical entity (one without mass) that is applied to the brass plate. We define as follows:

TABLE 30

Non Physical Entities

```
(defconcept Non-Physical-Entity (?e Entity)
  :documentation "A non physical entity without mass; for example a
  polish.")
(assert (Non-Physical-Entity polish))
```

Quantitative Reasoning & Satisficing

Discrete reasoning systems are powerful, but are plagued by the fact that real world data is often quantitative rather than qualitative. In our previous example, an entity could be either physical or non-physical. This is a discrete quality ascribed to entities in our ontology. Much of our world is described differently. Weather can be good or bad. This too is qualitative. But the goodness or badness of weather exists on a continuum. Temperature is measured in degrees. Precipitation is measured in terms of volume. Sunshine is measured in hours per day. This continuous data is also termed "quantitative." For any day we may have some of this information—but not necessarily all—and our information may be imprecise or contradictory. The way humans arrive at actionable conclusions is termed "satisficing," This process discerns what is statistically relevant in economic terms from what is not. To do this we have to combine qualitative reasoning with quantitative reasoning.

The method described here integrates quantitative logic with the discrete logic of predicate calculus to facilitate decision-making based on incomplete and continuous data.

The example below uses the concept of Meantime Between Failure (MBF) of products and parts as an illustration.

We begin by defining a statistically meaningful sample population—an excerpt is shown in table 31.

TABLE 31

Sample Population

;; A parts sample population
(assert (Part axle))
(assert (Part bearing))
(assert (Part belt))
(assert (Part box))
(assert (Part bracket))
(assert (Part buckle))
(assert (Part bulb))
(assert (Part bushing))
(assert (Part button))
(assert (Part canvas))
(assert (Part cart))
(assert (Part case))
(assert (Part chain))
(assert (Part cylinder))
(assert (Part drawer))
(assert (Part driveshaft))
...

We also define the concepts of Meantime Between Failure (MBF) and "HeavyDuty" construction.

TABLE 32

Meantime Between Failure Defined

; Define function Meantime Between Failure
(deffunction mbf ((?p Part)) :-> (?i float)
    :documentation "Meantime between failure of a part in months")
; Unary relation HeavyDuty
(defrelation heavyduty ((?p Part))
    :documentation "Parts advertisied by manufacturer as heavy duty")

Meantime Between Failure (MBF) in our model is TOTAL failure. Therefore a dresser with drawers where each drawer has a handle is not deemed to have failed in total if one handle breaks. A handle on its own that breaks suffers total failure, as it is no longer usable. Therefore a composite with multiple components will likely have a longer MBF than its components alone. We anticipate manufacturer advertisings to have a mixed impact on MBF.

An excerpt of sample data for parts is shown below. Note that this data is purely fictional and for illustration purposes only.

TABLE 33

Meantime Between Failure Sample Data (assert (mbf axle 12.3))
(assert (mbf bearing 46.0))
(assert (mbf belt 19.2))
(assert (mbf box 48.0))
(assert (mbf bracket 13.7))
(assert (mbf buckle 12.4))
(assert (mbf bulb 25.2))
(assert (mbf bushing 10.9))
(assert (mbf button 19.8))
(assert (mbf canvas 12.3))
(assert (mbf cart 77.4))
(assert (mbf case 23.0))
(assert (mbf chain 8.3))
(assert (mbf cylinder 12.5))
(assert (mbf drawer 25.2))
(assert (mbf driveshaft 14.6))
...

We will assume that composite product definitions are entered in the model as shown before.

We may now proceed to reason about parts for which we are missing Meantime Between Failure data. For this we will use an integrated neural network. Our neural network will be trained on MBF sample data and the propositional properties of Parts. For our purposes these will be the "part-of" and the "heavyduty" relations.

TABLE 34

Machine Learning Configuration

;; Define Neural Network
(set-error-print-cycle 1)
(set-partial-match-mode :nn)
(set-neural-network-training-method :BACKPROP)
(set-learning-rate 0.2)
(set-momentum-term 0.8)
;; Define regression module which will learn to
;; predict the age of a person based on a person's structural
;; properties. 50 training cycles.
(structured-neural-network-regression part mbf 50)

We define a new part and enquire about its predicted MBF.

TABLE 35

Regression Based Prediction

STELLA> (assert (Part unknownPart))
STELLA> (approximate unknownPart Mbf)
ANSWER> 17.976807290601176

Based on everything we know about parts in general, just knowing that unknownPart is a Part yields a prediction of 17.97 months meantime between failure. This is essentially in line with the central tendency for MBF in our sample data. How would this prediction change if we knew that its manufacturer classed the unknownPart as heavy duty? The system permits a direct and ad-hoc analysis of this question.

TABLE 36

Machine Learning Feature Selection

STELLA> (assert (HeavyDuty unknownPart))
|P|(HEAVYDUTY UNKNOWNPART)
STELLA> (approximate unknownPart Mbf)
ANSWER> 18.89186548264741

Apparently the impact is negligible—for this data model. This mechanism allows ad-hoc selection of features that are relevant to our model—traditionally a difficult task.

Deductive Quantitative Reasoning

The following paragraphs explore how being a "Composite" impacts the MBF prediction. Three components are created and designated parts of the "unknownPart," thus rendering "unknownPart" a composite. How is the MBF prediction affected?

TABLE 37

Machine Learning Feature Selection Continued

STELLA> (assert (Part componentA))
STELLA> (assert (Part componentB))
STELLA> (assert (Part componentC))
STELLA> (assert (part-of componentA unknownPart))
STELLA> (assert (part-of componentB unknownPart))

TABLE 37-continued

Machine Learning Feature Selection Continued

```
STELLA> (assert (part-of componentC unknownPart))
STELLA> (approximate unknownPart Mbf)
ANSWER> 48.83258616830254
```

The predicted part-of relation is transitive. It stands to reason that in a composite with a breadth of MBF has increased substantially reflecting the composite structure. What happens if we have a chain of components with subcomponents? Recall that the components (e.g. a dresser with many drawers) improves its Meantime Between Failure through many components, but that the inverse is true for a long and narrow chain of components. Any link in the chain can induce failure. This is modelled as follows.

TABLE 38

Machine Learning Feature Inference

```
STELLA> (assert (Part componentAA))
STELLA> (assert (Part componentBB))
STELLA> (assert (Part componentCC))
STELLA> (assert (part-of componentAA componentA))
STELLA> (assert (part-of componentBB componentB))
STELLA> (assert (part-of componentCC componentC))
STELLA> (approximate unknownPart Mbf)
ANSWER> 31.72638230248698
```

The outcome is as we predicted. A chain of subcomponents adversely affects reliability. But note how we said nothing new about "unknownPart" at all. The system has inferred the result through reasoning about the transitive relation "part-of" alone. Also note once more how the analysis is both ad-hoc and immediate. In a mainstream model of computation there would typically have been inter-process communication between the computation and a database or a statistical analysis system, followed by the return of the analytical results for evaluation. Here results are immediate because analysis, database and computation are integrated.

Visual Modeling

Visual Programming assists non-technical users in approaching complex domain expertise. The technique is frequently used in elementary schools to introduce children to computer programming: Children model sprites in an editor that is analogous to a game simulator. This paradigm also resonates with modeling of toy robotics and their movements through a scene. The approach presented here extends the concept of sprites moving through a scene to the concept of parts moving through a supply chain and products being described in terms of the steps of their manufacture. Block-oriented lexical constructs are mapped to the Lisp based syntax and semantics in PowerLoom and its Knowledge Interchange Format KIF, allowing only blocks to be connected that result in syntactically correct constructs. Please refer to FIG. 9 for an example of a visual model of a product specified in terms of the manufacturing ontology described in this disclosure.

Figure 10:
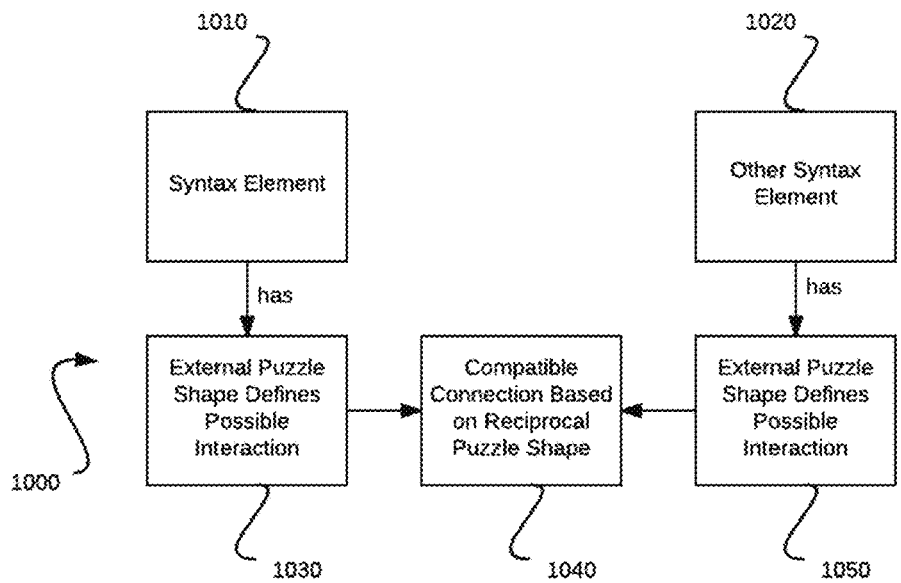
FIG. 10 is a block diagram describing geometric syntax verification in visual programming in one embodiment of the present invention.
Figure 11:
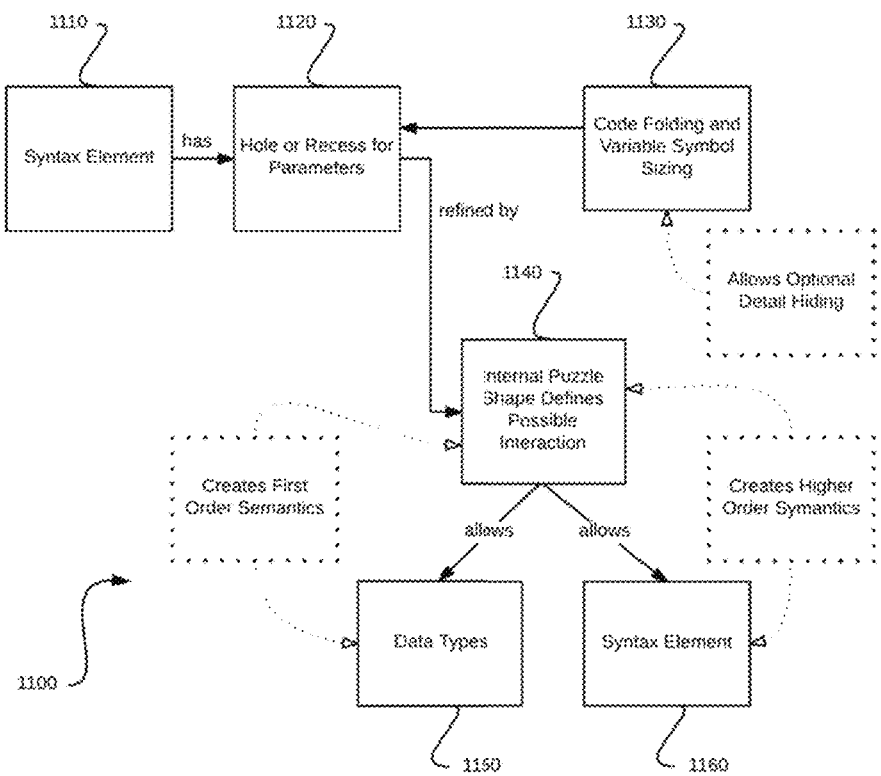
FIG. 11 is a block diagram describing higher order visual programming with detail hiding in one embodiment of the present invention.

FIG. 10 is a block diagram describing geometric syntax verification in visual programming 1000. Visual programming centers on the visual manipulation of symbols or block that represent lexical constructs as if drawing on a canvas. The user is assisted through visual cues and only symbols or blocks can be connected that result in syntactically correct constructs. To this end, the external contours of symbols or blocks representing syntactic elements 1010 and 1020 are shaped like puzzle pieces 1000 and 1050, allowing only matching pieces to be joined 1040. On its own, this approach has limited expressiveness: the many dimensions of a programming language are reduced to a flat canvas and a limited domain of possible interconnections. For this approach to extend to more complex problems, a greater degree of expressiveness is needed. This is attained by also shaping internal boundaries of holes traditionally meant for input parameters to accommodate other syntactical elements. This leans on the concept of code not just computing data, but other code. This is higher order logic and a key aspect of functional programming. FIG. 11 is a block diagram describing higher order visual programming with detail hiding 1100. Syntax element 1110 has a hole or recess to accommodate parameters 1120, the design of which is refined through shaping the internal contours in a puzzle-piece like way 1140. The syntax element 1110 may now accommodate both data types according to shape 1150 as well as other syntax elements according to shape 1160. This creates the higher order semantics of code accommodating other code and it also gives rise to nested composition of lexical constructs. To make nested composition on a two-dimensional medium feasible, code folding and variable symbol sizing 1130 are employed. This optionally allows detail to be hidden or revealed by unfolding syntax elements or by zooming into relevant level of detail.

Figure 12:
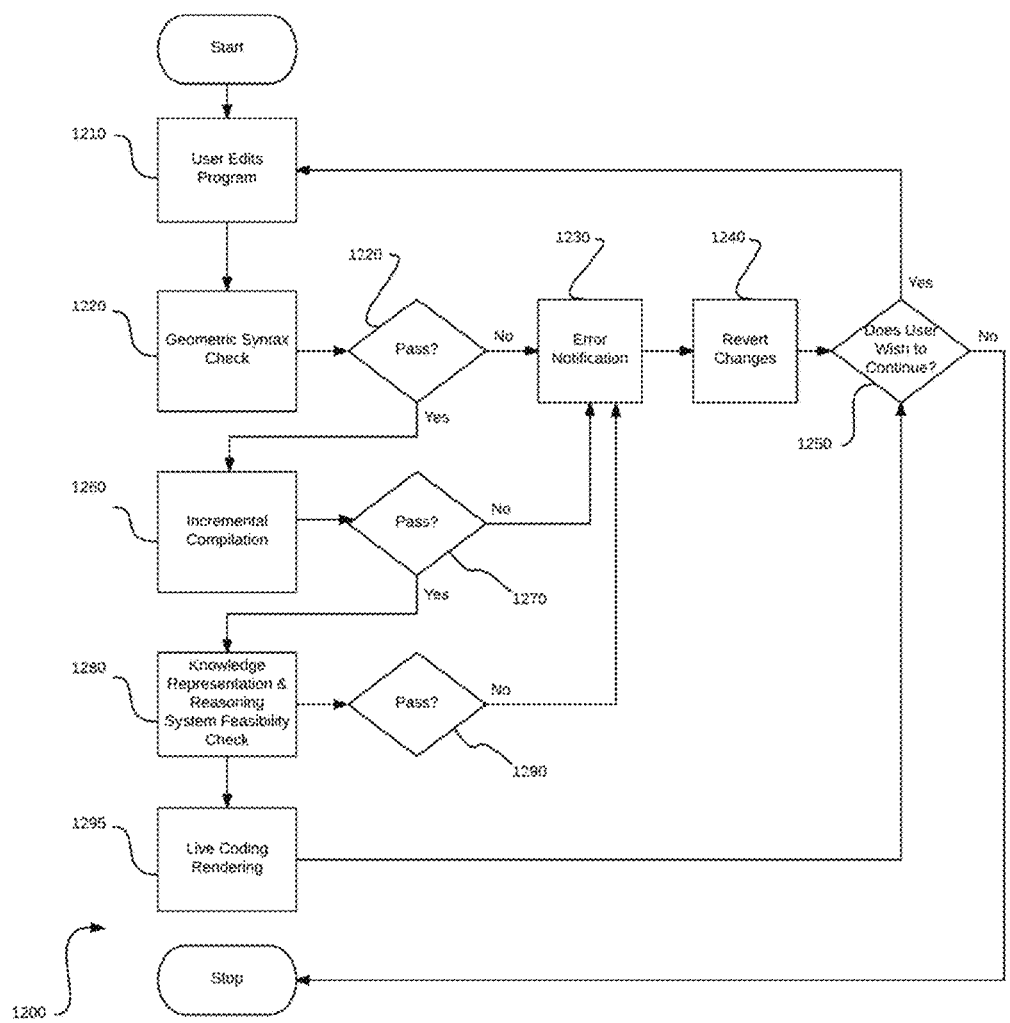
FIG. 12 is a flow diagram describing artificial intelligence assisted visual live programming in one embodiment of the present invention.

FIG. 12 is a flow diagram describing artificial intelligence assisted visual live programming 1200. The description in paragraph [0113] centers on the geometric aspects of visual programming. After a user visually edits the program 1210, the syntax is verified geometrically. Incompatible constructs are prevented from being connected 1220. Where incompatible constructs are attempted, an error notification is given 1230 and changes are reverted 1240. If the user wishes to continue 1250, the edit cycle continues. Where geometric syntax checks were successful, incremental compilation is attempted 1260. For the technology described in this disclosure, this can be effected simply by connecting the visual programming environment to a Read-Evaluation-Print-Loop ("REPL"). As the user enters new syntactic constructs, they are sent to the REPL for compilation and evaluation. As it is possible to have syntactic constructs that require multiple sub-constructs, it is also possible for an ultimately correct construct to be temporarily incorrect. This happens where a user has completed some, but not all sub-constructs that comprise a higher level construct. For this reason, it is possible to override the results of the incremental compilation validation step. Up to this point, ail checks are syntactic only. Step 1280 introduces semantic validation. This is the point where visual product modeling becomes artificial intelligence assisted. As explained, the technology described in this disclosure involves a Knowledge Representation and Reasoning System coupled to a manufacturing ontology and a robotic capability ontology. Constructs submitted in Knowledge Interchange Format can be checked for feasibly given the semantics of the relevant ontology which is to say it is possible, for example, to validate if a given product specification may be built given one or more specific manufacturing capabilities. Step 1280 leverages this ability.

Crucially, as explained in section [0078] of this disclosure, the Knowledge Representation and Reasoning System possesses the ability to explain its decisions. This means the user can be guided in product design. As with incremental compilation, it is possible for an ultimately correct construct to be temporarily incorrect while a user completes a series of steps. For this reason, it is possible to override the results of the semantic validation step. Finally, step 1295 renders models as they are created. This gives the system an aspect of what persons of ordinary skill in the art refer to as live coding. Such rendering may be visual or textual. An example of textual rendering might be real-time generation of a manufacturing plan for a product as the product specification is edited.

What is claimed is:

1. A computer-implemented method for configuring manufacturing supply chain operation for the production of bespoke products, comprising:
   a) providing at least one computer processor for processing data;
   b) providing at least one input device;
   c) providing at least one output device;
   d) providing a computer readable storage device;
   e) providing a first predicate calculus ontology which is configured to:
      i) define a plurality of manufacturing domain ontology concepts,
      ii) define a product in terms of specifications which are expressed in terms of said manufacturing domain ontology concepts;
   f) providing a second predicate calculus ontology which is configured to define the capabilities of a plurality of manufacturing facilities;
   g) providing a knowledge representation and reasoning system which is operatively configured for automated reasoning by means of predicate calculus logic
   wherein the elements of logic are first class citizens of predicate calculus logic and which is executed on said computer processor which is configured to:
      i) access said computer readable storage device for reading said first predicate calculus ontology and said second predicate calculus ontology,
      ii) receive a request describing the specification of said product in terms of said first predicate calculus ontology via said input device,
      iii) deduce through predicate calculus and automated reasoning using said request in (ii) and using said second predicate calculus ontology a manufacturing plan detailing how to produce the product described in (ii) using a list of manufacturing facilities, and
      iv) transmit said manufacturing plan via said output device;
   and whereby the creation of manufacturing supply chain functionality is enabled that transforms bespoke product specifications into manufacturing production plans thereby enabling real-time and ad-hoc supply chain planning.

2. The computer-implemented method of claim 1, wherein said manufacturing facilities are robotic.

3. The computer-implemented method of claim 1, wherein said second predicate calculus ontology is configured to categorize capabilities of manufacturing facilities using classification selected from the group consisting of hierarchical classification and relational classification.

4. The computer-implemented method of claim 1, wherein said knowledge representation and reasoning system is configured to furnish explanations for the reasoning of said knowledge representation and reasoning system in terms of causality whereby the step-wise reasoning of said knowledge representation and reasoning system about said manufacturing plan can be understood, enabling the improvement of product designs.

5. The computer-implemented method of claim 1, wherein said knowledge representation and reasoning system is configured to operate based on partial satisfaction of logical predicates coupled with an embedded neural network wherein the neural network applies structural regression over an ontology selected from the group consisting of said first predicate calculus ontology and said second predicate calculus ontology such that qualitative reasoning in said knowledge representation and reasoning system is augmented with predictive, quantitative reasoning and the ability to effect imputation of incomplete input data whereby supply chain planning is able to successfully arrive at actionable supply chain plans despite incomplete and imprecise product requirements.

6. The computer-implemented method of claim 1, further providing a computer-implemented method for visually modeling product designs comprising:
   a) providing a display;
   b) receiving input from a human operator using interconnected lexical constructs selected from the group consisting of graphical symbols and blocks representing computer programming language elements to describe products in terms of said first predicate calculus ontology which is configured to:
      i) validate interconnections of said lexical constructs according to geometric properties of said lexical constructs in the context of said first predicate calculus ontology whereby the programing language syntax of said lexical constructs is verified, and
      ii) validate inputs of said lexical constructs representing computer programming language and validate parameterized inputs to said lexical constructs which represent computer programming language constructs according to the geometric properties of said lexical constructs and the geometric properties of their inputs using said knowledge representation and reasoning system in the context of said first predicate calculus ontology whereby the meaning of said lexical constructs representing computer programming language are verified against said first predicate calculus ontology;
   c) displaying designs of products in terms of said first predicate calculus ontology using said lexical constructs on said display;
   d) rendering graphically designs of products in terms of said first predicate calculus ontology on said display whereby a human operator can visualize products being designed, and whereby a human operator enjoys the benefit of an artificial intelligence assisted graphical product development environment assisting in product design and visual manipulation of higher order logic computer language constructs is enabled in support of automated reasoning.

7. The computer-implemented method of claim 1, wherein said first predicate calculus ontology and said second predicate calculus are implemented as a formal naming and/or definition of types and/or properties, and/or interrelationships which are initialized from and/or stored in a model selected from the group consisting of a relational database management model and an object oriented model which utilize a logic object coercion mechanism.

8. A knowledge representation and reasoning system for configuring manufacturing supply chain operation for the production of bespoke products, comprising:
   a) at least one computer processor for processing data;
   b) at least one input device;
   c) at least one output device;
   d) a computer readable storage device;

e) a first predicate calculus ontology which is configured to:
  i) define a plurality of manufacturing domain ontology concepts,
  ii) define a product in terms of specifications which are expressed in terms of said manufacturing domain ontology concepts;
f) a second predicate calculus ontology which is configured to define the capabilities of a plurality of manufacturing facilities;
g) a knowledge representation and reasoning system which is operatively configured for automated reasoning by means of predicate calculus logic wherein the elements of logic are first class citizens of predicate calculus logic and which is operatively configured to integrate computation selected from the group consisting of object oriented computation and relational computation and functional computation with said system of predicate calculus logic and which is executed on said computer processor which is configured to:
  i) access said computer readable storage device for reading said first predicate calculus ontology and said second predicate calculus ontology,
  ii) receive a request describing the specification of said product in terms of said first predicate calculus ontology via said input device,
  iii) deduce through a system of predicate calculus and automated reasoning using said request in (ii) and using said second predicate calculus ontology a manufacturing plan detailing how to produce the product described in (ii) using a list of manufacturing facilities, and
  iv) transmit said manufacturing plan via said output device; and
whereby the creation of manufacturing supply chain functionality is enabled that transforms bespoke product specifications into manufacturing production plans thereby enabling real-time and ad-hoc supply chain planning, and the efficacy of the combination of the computer processor, the input device, the output device and the computer readable storage device in curating manufacturing production plans is improved through the integration of aspects of computation with the knowledge representation and reasoning system.

9. The knowledge representation and reasoning system of claim 8, wherein said manufacturing facilities are robotic.

10. The knowledge representation and reasoning system of claim 8, wherein said second predicate calculus ontology is configured to categorize capabilities of manufacturing facilities using classification selected from the group consisting of hierarchical classification and relational classification.

11. The knowledge representation and reasoning system of claim 8, wherein said knowledge representation and reasoning system is configured to furnish explanations for the reasoning of said knowledge representation and reasoning system in terms of causality whereby the step-wise reasoning of said knowledge representation and reasoning system about said manufacturing plan can be understood, enabling the improvement of product designs.

12. The knowledge representation and reasoning system of claim 8, wherein said knowledge representation and reasoning system is configured to operate based on partial satisfaction of logical predicates coupled with an embedded neural network wherein the neural network applies structural regression over an ontology selected from the group consisting of said first predicate calculus ontology and said second predicate calculus ontology such that qualitative reasoning in said knowledge representation and reasoning system is augmented with predictive, quantitative reasoning and the ability to effect imputation of incomplete input data whereby supply chain planning is able to successfully arrive at actionable supply chain plans despite incomplete and imprecise product requirements.

13. The knowledge representation and reasoning system of claim 8, further providing a user interface system for visually modeling product designs comprising:
  a) a display;
  b) a user interface means for receiving input from a human operator using interconnected lexical constructs selected from the group consisting of graphical symbols and blocks representing computer programming language elements to describe products in terms of said first predicate calculus ontology which is configured to:
    i) validate interconnections of said lexical constructs according to geometric properties of said lexical constructs in the context of said first predicate calculus ontology whereby the programing language syntax of said lexical constructs is verified, and
    ii) validate inputs of said lexical constructs representing computer programming language and validate parameterized inputs to said lexical constructs which represent computer programming language constructs according to the geometric properties of said lexical constructs and the geometric properties of their inputs using said knowledge representation and reasoning system in the context of said first predicate calculus ontology whereby the meaning of said lexical constructs representing computer programming language are verified against said first predicate calculus ontology;
  c) a user interface means for displaying designs of products in terms of said first predicate calculus ontology using said lexical constructs on said display;
  d) a user interface means for rendering graphically designs of products in terms of said first predicate calculus ontology on said display whereby a human operator can visualize products being designed,
  and whereby a human operator enjoys the benefit of an artificial intelligence assisted graphical product development environment assisting in product design and visual manipulation of higher order logic computer language constructs is enabled in support of automated reasoning.

14. The knowledge representation and reasoning system of claim 8, wherein said first predicate calculus ontology and said second predicate calculus ontology are implemented as a formal naming and/or definition of types and/or properties, and/or interrelationships initialized from and/or stored in a model selected from the group consisting of a relational database management model and an object oriented model which utilize a logic object coercion mechanism.

15. A knowledge representation and reasoning system coupled with an embedded neural network for configuring manufacturing supply chain operation for the production of bespoke products, comprising:
  a) at least one computer processor for processing data;
  b) at least one input device;
  c) at least one output device;
  d) a computer readable storage device;
  e) a first predicate calculus ontology which is configured to:
    i) define a plurality of manufacturing domain ontology concepts, ii) define a product in terms of specifications which are expressed in terms of said manufacturing domain ontology concepts;

f) a second predicate calculus ontology which is configured to define the capabilities of a plurality of manufacturing facilities;

g) a knowledge representation and reasoning system coupled with an embedded neural network which is operatively configured for automated reasoning by means of predicate calculus logic wherein the elements of logic are first class citizens of predicate calculus and which is operatively configured to integrate computation selected from the group consisting of object oriented computation and relational computation and functional computation with said system of predicate calculus logic and which is configured to evaluate predicate satisfaction according to a mode of satisfaction selected from the group consisting of partial satisfaction of logical predicates and full satisfaction of logical predicates and which is executed on said computer processor which is configured to:

i) access said computer readable storage device for reading said first predicate calculus ontology and said second predicate calculus ontology, ii) receive a request describing the specification of said product in terms of said first predicate calculus ontology via said input device, iii) apply structural regression over an ontology selected from the group consisting of said first predicate calculus ontology and said second predicate calculus ontology using said embedded neural network and partial satisfaction of logical predicates to compute a predicted inference, iv) deduce through a system of predicate calculus and automated reasoning using said request in (ii) and using said second predicate calculus ontology and using said predicted inference in (iii) a manufacturing plan detailing how to produce the product described in (ii) using a list of manufacturing facilities, and iv) transmit said manufacturing plan via said output device; and whereby the creation of manufacturing supply chain functionality is enabled that transforms bespoke product specifications into manufacturing production plans thereby enabling real-time and ad-hoc supply chain planning, and the efficacy of the combination of the computer processor, the input device, the output device and the computer readable storage device in curating manufacturing production plans is improved through the integration of aspects of computation with the knowledge representation and reasoning system, and the processes of curating manufacturing production plans for supply chains is improved by allowing said predicate calculus knowledge representation and reasoning system to perform weighted inference according to statistical relevance and by allowing said predicate calculus knowledge representation and reasoning system to effect imputation of incomplete input data to arrive at actionable supply chain plans and by allowing said predicate calculus knowledge representation and reasoning system to logically reason with imprecise input data.

16. The knowledge representation and reasoning system of claim 15, wherein said manufacturing facilities are robotic.

17. The knowledge representation and reasoning system of claim 15, wherein said second predicate calculus ontology is configured to categorize capabilities of manufacturing facilities using classification selected from the group consisting of hierarchical classification and relational classification.

18. The knowledge representation and reasoning system of claim 15, wherein said knowledge representation and reasoning system is configured to furnish explanations for the reasoning of said knowledge representation and reasoning system in terms of causality whereby the step-wise reasoning of said knowledge representation and reasoning system about said manufacturing plan can be understood, enabling the improvement of product designs.

19. The knowledge representation and reasoning system of claim 15, further providing a user interface system for visually modeling product designs comprising:

a) a display;

b) a user interface means for receiving input from a human operator using interconnected lexical constructs selected from the group consisting of graphical symbols and blocks representing computer programming language elements to describe products in terms of said first predicate calculus ontology which is configured to:

i) validate interconnections of said lexical constructs according to geometric properties of said lexical constructs in the context of said first predicate calculus ontology whereby the programing language syntax of said lexical constructs is verified, and ii) validate inputs of said lexical constructs representing computer programming language and validate parameterized inputs to said lexical constructs which represent computer programming language constructs according to the geometric properties of said lexical constructs and the geometric properties of their inputs using said knowledge representation and reasoning system in the context of said first predicate calculus ontology whereby the meaning of said lexical constructs representing computer programming language are verified against said first predicate calculus ontology;

c) a user interface means for displaying designs of products in terms of said first predicate calculus ontology using said lexical constructs on said display;

d) a user interface means for rendering graphically designs of products in terms of said first predicate calculus ontology on said display whereby a human operator can visualize products being designed, and whereby a human operator enjoys the benefit of an artificial intelligence assisted graphical product development environment assisting in product design and visual manipulation of higher order logic computer language constructs is enabled in support of automated reasoning.

20. The knowledge representation and reasoning system of claim 15, wherein said first predicate calculus ontology and said second predicate calculus ontology are implemented as a formal naming and/or definition of types and/or properties, and/or interrelationships initialized from and/or stored in a model selected from the group consisting of a relational database management model and an object oriented model which utilize a logic object coercion mechanism.

* * * * *